March 21, 1961 C. B. LACY 2,975,872
AUTOMATIC AIR BRAKE RELEASE
Filed Aug. 24, 1956 2 Sheets-Sheet 1

March 21, 1961
C. B. LACY
2,975,872
AUTOMATIC AIR BRAKE RELEASE
Filed Aug. 24, 1956
2 Sheets-Sheet 2
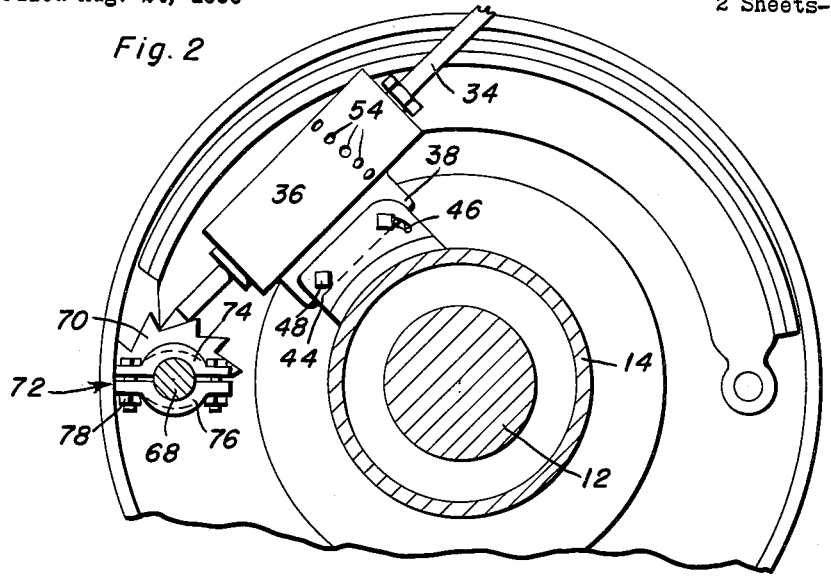
Fig. 2
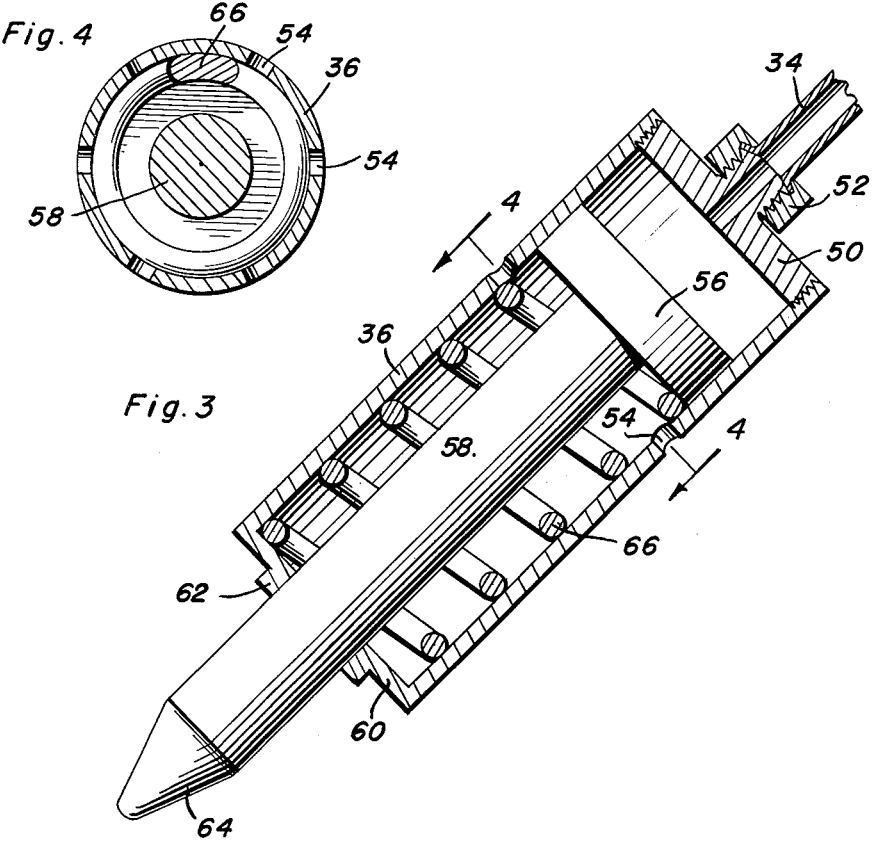
Fig. 4
Fig. 3

United States Patent Office 2,975,872
Patented Mar. 21, 1961

2,975,872

AUTOMATIC AIR BRAKE RELEASE

Carl B. Lacy, Box 4034, Roanoke, Va., assignor of one-fourth each to Roy N. Beheler, Nathan V. Nininger, Jr., and Charles S. McNulty, Jr.

Filed Aug. 24, 1956, Ser. No. 605,968

3 Claims. (Cl. 188—152)

The present invention relates to improvements in vehicle brakes and is particularly directed to a new and novel means for automatically releasing the brakes of a power operated system, particularly the brakes of an air system.

A primary object of the present invention is to provide an automatically functioning brake release means which is adapted to cooperate with conventional brake structure to ensure the positive and complete release of the wheel brakes of a vehicle.

Another important object of the present invention is to provide means for aiding in the return of the brake cam of an air brake system to a release position so that the brake shoe is completely and positively moved away from the brake drum, such means being actuated automatically in response to the release of the brake pedal by the air that is normally vented through a quick release valve to the atmosphere.

Conventionally, the brake valve of an air brake system controls the brake operation by directing the flow of air from an air reservoir through a quick release valve to a brake diaphragm which, through suitable mechanical connections, controls the application of the brakes. When the quick release valve is released, the valve directs the flow of air from the brake diaphragms to the atmosphere. Often, due to failure of a particular brake cam to return, caused by accumulation of dirt on the cam, worn brake linings and the like, a tractor-trailer will "jackknife." The failure of a brake cam to return also results in excessive brake lining and tire wear.

It is the primary purpose of the present invention to cause a positive and complete return of the brake cams in a completely automatic way by converting the normally vented air into a mechanical force for applying an initial turning force to the cam shaft and result in the initial return of the brake cam, the final return of the brake cams being accomplished by the brake springs.

Generally stated, the present invention comprehends the provision of means for capturing the air, which is normally vented to the atmosphere by the quick release valve after the application and release of the brakes, and converting such normally released air into a mechanical force to ensure that the brake cams are moved to a return position. Such means includes, with regard to a given wheel, a cylinder which has its piston actuated by the captured air so as to operate a piston rod and means on the cam shaft that is operated on by the piston rod so as to rotate the cam shaft and aid in the movement of the brake cam to a return position.

The foregoing and ancillary objects, including the provision of an inexpensive, safe and compact automatic air brake release means, are attained by this invention, the preferred embodiments of which are set forth in the following description and illustrated in the accompanying drawings, wherein:

Figure 2 is a side elevational view of the present invention, with part of the axle structure shown in section and with the brake release piston rod shown in extended position;

Figure 3 is a longitudinal sectional view of the brake release cylinder, showing the piston rod in elevation;

Figure 4 is a cross-sectional view taken on line 4—4 of Figure 3;

Figure 1:
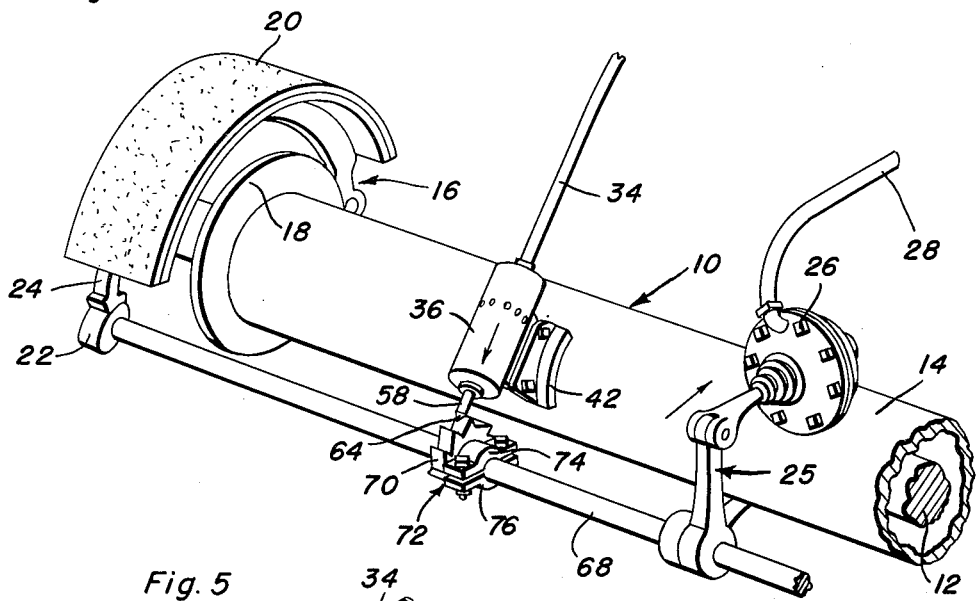
Figure 1 is a fragmentary perspective view of a conventional vehicle wheel brake assembly with the automatic release means of this invention applied thereto.

Referring now more particularly to the accompanying drawings, the vehicle wheel assembly 10 is of conventional construction and includes an axle 12 and an axle housing 14. For simplicity purposes, the actual brake assembly 16 is shown as composed of the drum 18 and the brake shoe 20. The brake shoe 20 is actuated by a brake cam 22 which acts on a brake shoe plate 24 and is actuated by a lever mechanism 25 controlled by a brake diaphragm 26. The brake valve controls the application of the brakes with the air passing from the reservoir through the brake valve, when open, to the quick release valve 32 and thence to the brake chamber to act on the diaphragm therein. The fluid motor 26 is supplied with air by the hose 28 and a similar hose (not numbered) leads to an identical fluid motor (not shown).

Conventionally, the air is permitted to escape from the diaphragm to the atmosphere through the exhaust port of the quick release valve, when the brake pedal is released, and such air has no further function. The present invention includes a pipe plug 30 which is provided in the quick release valve 32 and is provided with a plurality of hose fittings (not shown), the number varying in accordance with specific tractor-trailer requirements.

Figure 5:
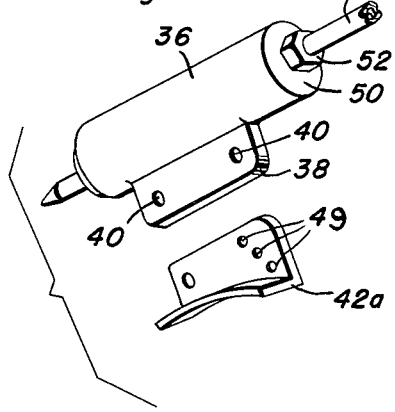
Figure 5 is an exploded perspective view of a modified form of mounting means for the brake release cylinder, and, Figure 6 is a perspective showing of a modified form of brake cam shaft actuator.

As shown in Figure 1, one of the hoses 34, which is connected to the exhaust port of the quick release valve, leads to a cylinder 36, which is adjustably mounted on the housing 14 by the means shown in Figures 2 and 5. As shown in Figures 2 and 5, cylinder 36 is provided with a radially projecting, axial mounting flange 38 that is formed with longitudinally spaced apertures 40. For the purpose of mounting of the cylinder on the axle housing, an angular bracket 42 is provided and has one of its flanges welded or otherwise fixed on the axle housing 14.

As shown in Figure 2, the other flange of the bracket has a transverse aperture 44 and a longitudinally spaced transverse slot 46 formed therein. Bolts 48 pass through the aligned apertures 40 and 44 and aligned aperture 40 and slot 46 and adjustably mount the cylinder on the bracket 42.

As shown in Figure 5, the upstanding flange of the bracket 42a may be formed with a series of adjustment holes 49 instead of the slot 46 for adjustably mounting the cylinder on the bracket.

The hose 34 is secured to the closed end 50 of the cylinder 36 by a suitable central fitting 52 and the wall of the cylinder is formed adjacent such end with a circumferentially spaced series of radial air release holes 54. A piston 56 is slidably fitted in the cylinder and has its piston rod 58 slidably and airtightly extended through the opposite end 60 of the cylinder 36. The end 60 has a collar 62 formed thereon around the opening therein to reinforce the end at the opening, through which the piston rod slidably and sealingly extends. A spring 66 is coiled around the piston rod and bears between the end 60 of the cylinder and the piston 56, the spring being a weak spring with only sufficient tension to return the piston to its normal position after the release of the air pressure through the holes in the wall of the cylinder.

Thus, air carried by the hose 34 acts on the piston 56 to force the piston rod outwardly from the cylinder and the spring returns the piston and piston rod to their normal positions as the air behind the piston is vented to the atmosphere through the holes 54.

The piston rod is adapted, upon its forced outward movement, to act on the cam shaft 68 and rotate it in a counterclockwise direction or in a direction opposite to that given it by the lever mechanism activated by the brake diaphragm 26, as shown by the arrows in Figure 1. In this respect, as shown in Figures 1 and 2, a semi-circular cog 70 is fixed on the cam shaft 68 by a clamp means 72 which includes a laterally offset clamp strap 74 on the cog and a complemental clamp strap 76. The straps are fixedly circumposed on the cam shaft by bolts 78. The cog is engaged by the end 64 of the piston rod and, upon the outer thrust of the piston rod, the cam shaft is rotated to cause the cam to start to rotate back to its normal position and ensure the positive movement of the brake shoe 20 away from the brake shoe plate 24.

Figure 6:
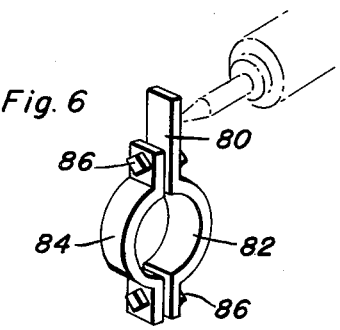
Figure 1A:
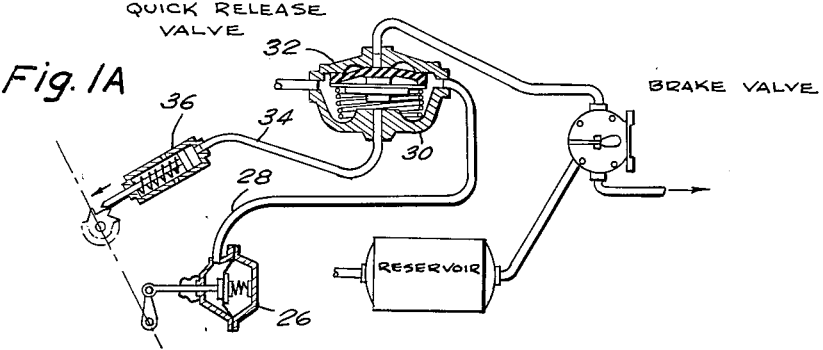
Figure 1A is a diagrammatic illustration of an air brake system showing the automatic release means of the present invention incorporated therein.

Also, in this respect, a finger 80, as shown in Figure 6, may be used, instead of the cog. The finger is offset from a strap 82 which is bolted by means of a complemental strap 84 and bolts 86 onto the cam shaft 68.

In operation, when the brake pedal is released by an operator, the air, supplied to the brake diaphragm 26, reverses its flow and is captured at the exhaust port of the quick release valve 32 and carried by the air plugs and hoses to the various cylinders 36. The air pressure in one of the cylinders 36 acts on the piston to force the piston rod 58 outwardly and downwardly so that the outer end 64 thereof strikes one of the teeth of the cog or the finger 80 and starts the cam shaft 68 to turn back to a return or normal position, permitting the brake shoe to separate from the drum by normal spring action. When the piston 56 passes the air release holes 54, the air is dissipated, releasing pressure on the coil spring and permitting the spring to return the piston to the other or top end of the cylinder.

The cog 70 and finger 80 may be adjusted on the cam shaft, when the brakes are adjusted, by merely loosening the clamping straps, adjusting the brakes to the desired position, applying air to the brakes and turning the cog or the finger to a position on the cam shaft wherein the distance between the teeth or finger and the outer end of the piston rod is approximately one-half the distance of travel of the pitson rod. The straps are then tightened to secure the cog or finger in place. The cog or finger is now in position to receive a hammer like impact from the end of the piston rod.

While only one cylinder 36 and attendant assembly has been shown, it is understood that such assembly will be mounted and used for each wheel of a trailer or vehicle which uses air for its brake system.

Thus, while the best known form of and environment for this invention has been shown and described herein, other forms and environments may be realized, as come within the scope and spirit of the appended claims.

What is claimed is:

1. An automatic air brake release means for an air brake system including a cam shaft and having a quick release valve connected between a brake valve and an air operated diaphragm which actuates the cam shaft to apply the brakes; said means comprising an air cylinder connected to the quick release valve for capturing the air normally released to the atmosphere from the quick release valve after the application and release of the brakes, said air cylinder being connected to said quick release valve means to receive the air at one end therefrom, a piston slidably fitted in the cylinder and actuated by the air, a piston rod carried by the piston and sealingly and slidably extended through the other end of the cylinder and moved outwardly by the piston, means for venting the air from the cylinder after a predetermined travel of the piston rod, resilient means for returning the piston to its normal position after the air has been vented from the cylinder and means adjustably fitted on the cam shaft, said piston rod normally spaced from said adjustable means and actuated by the outward travel of the piston to strike said adjustable means to initiate the return of the cam shaft to a normal position.

2. An automatic air brake release means as claimed in claim 1, wherein said adjustable means includes an abutment means, clamp means adjustably securing the abutment means on the cam shaft, and means mounting the cylinder and piston rod at right angles to the abutment means so that the piston rod strikes such means.

3. An automatic air brake release means as claimed in claim 1, wherein said adjustable means includes an abutment member adjustably fixed on the cam shaft and said piston rod is disposed perpendicular thereto and has a free outer striking end adapted to strike the abutment member and rotate the cam shaft.

References Cited in the file of this patent
UNITED STATES PATENTS

| | | |
|---|---|---|
| 1,004,000 | Emery | Sept. 26, 1911 |
| 1,819,952 | Fink | Aug. 18, 1931 |
| 2,726,738 | Fawick | Dec. 13, 1955 |